US005759077A

United States Patent [19]

Yoshida

[11] Patent Number: 5,759,077

[45] Date of Patent: Jun. 2, 1998

[54] METHOD OF MAGNETICALLY PROCESSING COLOR CATHODE-RAY TUBE

[75] Inventor: Akihiko Yoshida, Aichi, Japan

[73] Assignee: Sony Corporation, Tokyo, Japan

[21] Appl. No.: 643,879

[22] Filed: May 7, 1996

[30] Foreign Application Priority Data

May 10, 1995 [JP] Japan ........................ 7-112040

[51] Int. Cl.$^{6}$ .................. H04N 9/29; H01F 13/00

[52] U.S. Cl. ................................ 445/1; 315/8

[58] Field of Search .................. 445/1, 47; 315/8

[56] References Cited

U.S. PATENT DOCUMENTS 4,316,119 2/1982 Cooper .
5,287,242 2/1994 Kamimura .................. 315/8 X
5,475,283 12/1995 Yoshida .................. 315/8
5,696,565 12/1997 Shintani et al. .................. 315/8 X

FOREIGN PATENT DOCUMENTS 0 265 614 4/1988 European Pat. Off. .
1 110 926 4/1968 United Kingdom .

OTHER PUBLICATIONS

"Resonant Degaussing For TV And High Definition Color Monitors", 8087 IEEE Transactions on Consumer Electronics CE-32 (1986) Nov., No. 4, New York, NY USA.

*Primary Examiner*—Kenneth J. Ramsey
*Attorney, Agent, or Firm*—Hill & Simpson

[57] ABSTRACT

A color cathode-ray tube is demagnetized or magnetized in a magnetic transfer process with a direct-current biasing magnetic field, using an alternating-current magnetic field which is attenuated to a median thereof in a median attenuating time of at least 0.1 second.

6 Claims, 6 Drawing Sheets

METHOD OF MAGNETICALLY PROCESSING COLOR CATHODE-RAY TUBE

BACKGROUND OF THE INVENTION

1. Field of the Invention

The present invention relates to a method of magnetically processing a color cathode-ray tube by demagnetizing the cathode-ray tube or magnetizing the cathode-ray tube with a direct-current biasing magnetic field.

2. Description of the Related Art

Color cathode-ray tubes have a phosphor screen disposed on the inner surface of a glass panel and comprising red, green, and blue phosphor layers. Three cathode rays, i.e., electron beams, emitted from respective electron guns are landed on the respective red, green, and blue phosphor layers to cause the phosphor layers to emit light in three primary colors.

However, the electron beams tend to hit the phosphor layers with a landing error, causing an undesirable color shift. One solution has been to embed carbon films of non-emission black substance between the phosphor layers to give a margin for the landing of the cathode rays for thereby improving the color shift.

When a color cathode-ray tube is manufactured, a color separation electrode and a glass tube tend to be thermally deformed, the glass tube is liable to be deformed at the time it is evacuated and sealed, the color separation electrode is apt to be mechanically displaced out of position and magnetized in a welding process. These deformations, strains, and magnetization are responsible for positional errors with which the cathode rays arrive at the phosphor screen.

FIG. 1 of the accompanying drawings shows a Trinitron (registered trademark) color cathode-ray tube 1. As shown in FIG. 1, the color cathode-ray tube 1 has a phosphor screen (not shown) disposed on the inner surface of a glass panel 2 and comprising strips of red, green, and blue phosphor layers (hereinafter referred to as "phosphor stripes"). The color cathode-ray tube 1 also has a color separation electrode 3 known as an aperture grill positioned in confronting relation to the phosphor screen.

The color separation electrode 3 comprises a thin electrode plate 5 of metal having a plurality of vertically elongate slits 4 defined therein by etching, and a frame 6 on which the thin electrode plate 5 is mounted under tension, the frame 6 having support springs 7 welded to sides of the frame 6 through respective spring holders 8 and engaging panel pins (not shown) embedded in the inner surface of the glass panel 2. Generally, the thin electrode plate 5 and the frame 6 are made primarily of a magnetic material containing iron.

The color cathode-ray tube 1 further includes a frit seal 10 by which the glass panel 2 is joined to a funnel 11, and outer carbon films 12 coated on an outer surface of the funnel 11.

If the cathode rays arrive at the phosphor screen off a desired position thereon, then the phosphor screen suffers a color shift or a reduction in luminance, failing to display images of desired qualities.

To correct the cathode rays out of the displaced position, there has been proposed a process of applying an alternating-current attenuating magnetic field while a biasing magnetic field is being applied by a ring coil surrounding a region near the color separation electrode, to magnetize the color separation electrode (which is a process known as so-called magnetic transfer) for thereby varying the path of the cathode rays with the magnetizing magnetic field, as disclosed in Japanese patent application No. 61-133039.

Various proposals have also been made with respect to the shape and position of a coil for generating a direct-current magnetic field and a coil for generating an alternating-current attenuating magnetic field in order to effectively magnetize the color separation electrode, as revealed in Japanese patent application No. 5-11290.

However, the disclosed arrangements may possibly fail to sufficiently eliminate any residual magnetization produced in the welding process or stably magnetize, through magnetic transfer, the color separation electrode with the direct-current biasing magnetic field for correcting the path of the cathode rays.

SUMMARY OF THE INVENTION

It is therefore an object of the present invention to provide a method of magnetically processing a color cathode-ray tube by stably demagnetizing the cathode-ray tube or magnetizing the cathode-ray tube with a direct-current biasing magnetic field.

According to the present invention, there is provided a method of manufacturing a color cathode-ray tube, comprising the steps of fabricating a color cathode-ray tube, generating a direct-current biasing magnetic field, placing the color cathode-ray tube in the generated direct-current biasing magnetic field, generating an alternating-current magnetic field in the direct-current biasing magnetic field in which said color cathode-ray tube is placed, and attenuating said alternating-current magnetic field to a median thereof in a median attenuating time of at least 0.1 second or preferably 0.2 second. The direct-current biasing magnetic field may have a value of zero.

According to the present invention, there is also provided a method of magnetically processing a color cathode-ray tube, comprising the steps of placing automatic degaussing coils on a color cathode-ray tube, supplying demagnetizing currents to said automatic degaussing coils to generate an alternating-current magnetic field, and attenuating said alternating-current magnetic field to a median thereof in a median attenuating time of at least 0.1 second or preferably at least 0.2 second.

The color cathode-ray tube may comprise a phosphor screen comprising a plurality of color stripes and a color selection electrode disposed in confronting relation to said phosphor screen and having a plurality of vertically elongate slits defined therein.

DETAILED DESCRIPTION OF THE PREFERRED EMBODIMENT

Figure 1:
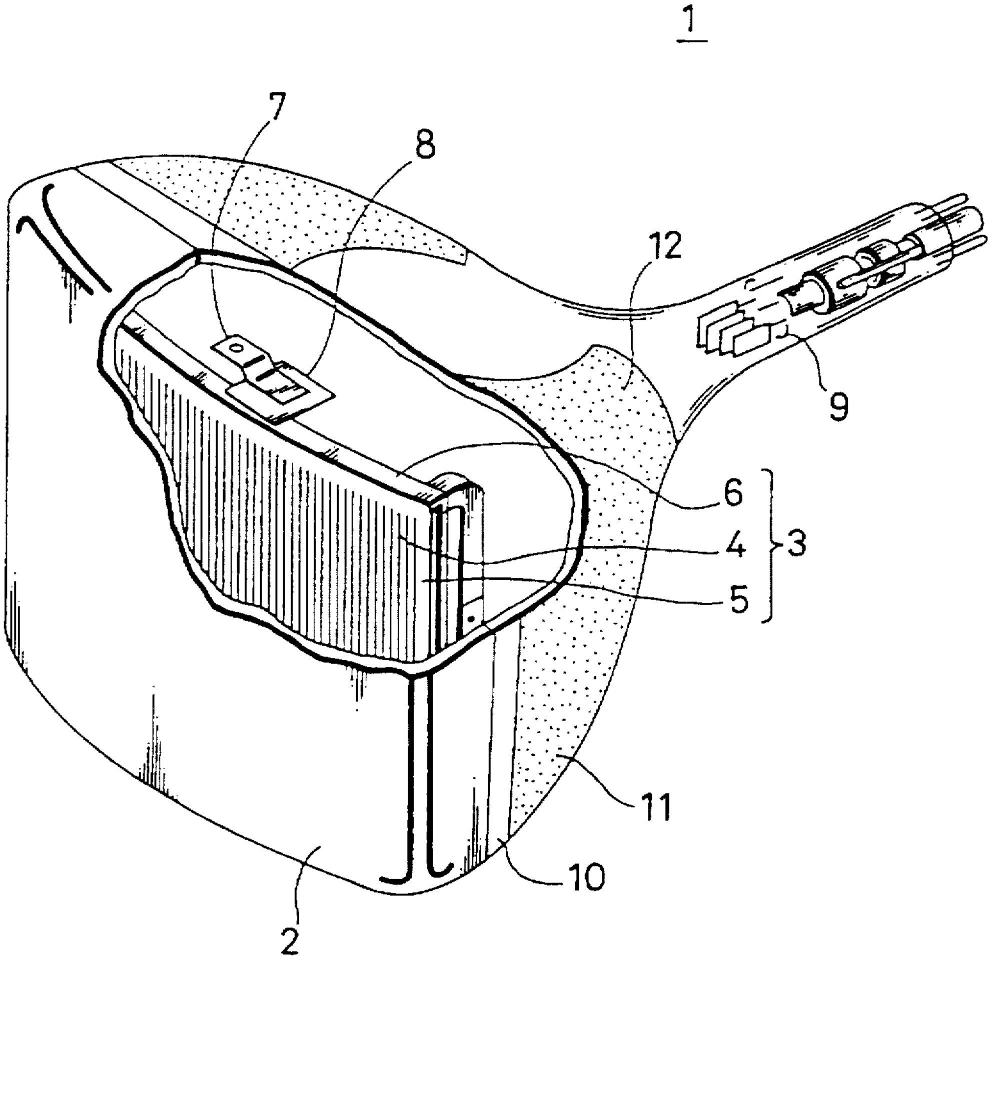
FIG. 1 is a perspective view, partly cut away, of a color cathode-ray tube.

The principles of the present invention are applied to the Trinitron color cathode-ray tube 1 shown in FIG. 1.

First, a method of measuring a deviation or error between the center of a phosphor stripe and the central axis of a cathode ray (electron beam) will be described below.

Figure 2:
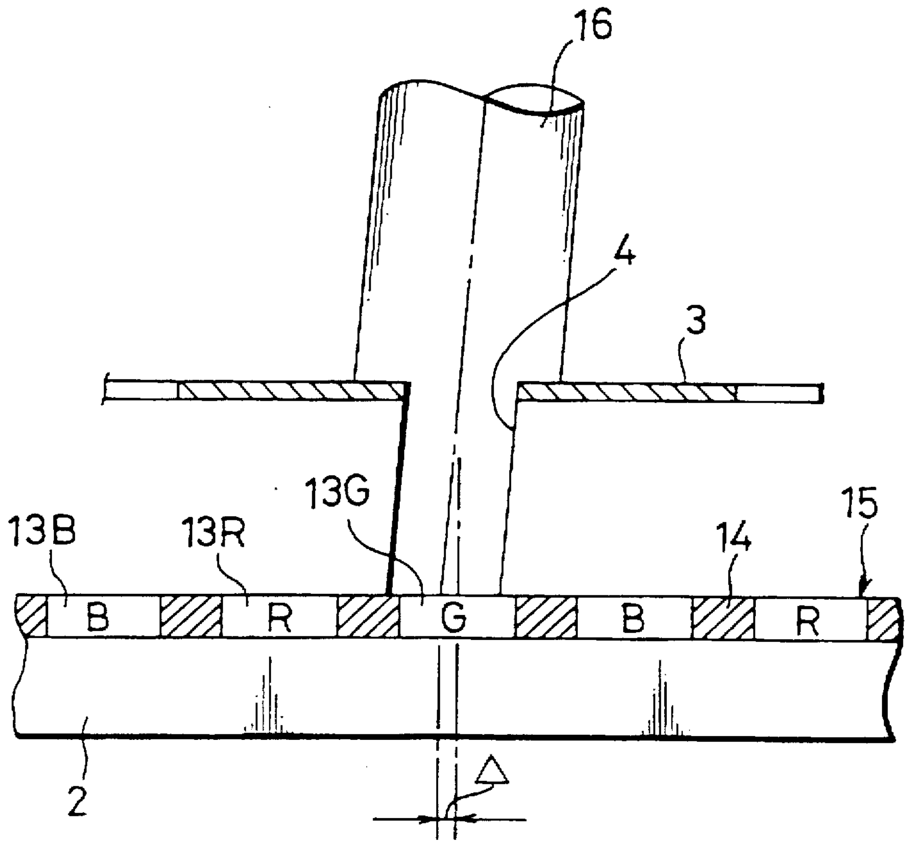
FIG. 2 is an enlarged cross-sectional view illustrative of a deviation or error (Δ) between the center of a phosphor stripe and the central axis of a cathode ray.

As shown in FIG. 2, a glass panel 2 of a color cathode-ray tube has on its inner surface a color phosphor screen 15 which comprises red, green, and blue phosphor stripes 13R, 13G, 13B and non-emission carbon films 14 interposed therebetween. FIG. 2 shows a deviation or error Δ which occurs between the center of one of the phosphor stripes 13R, 13G, 13B and the central axis of a cathode ray 16 which is applied through a slit 4 in a color separation electrode 3.

The deviation Δ shown in FIG. 2 is measured as follows: The luminance of the cathode ray 16, which is applied as a ray of green light to the color phosphor screen 15, is detected by a photosensor while the cathode ray 16 is being scanned or displaced over the color phosphor screen 15. When the detected luminance of the cathode ray 16 is greatest, i.e., when the central axis of the cathode ray 16 is positioned at the center of the green phosphor stripe 13G, the deviation Δ shown in FIG. 2 is detected from the displacement of the cathode ray 16 at the time.

Figure 3:
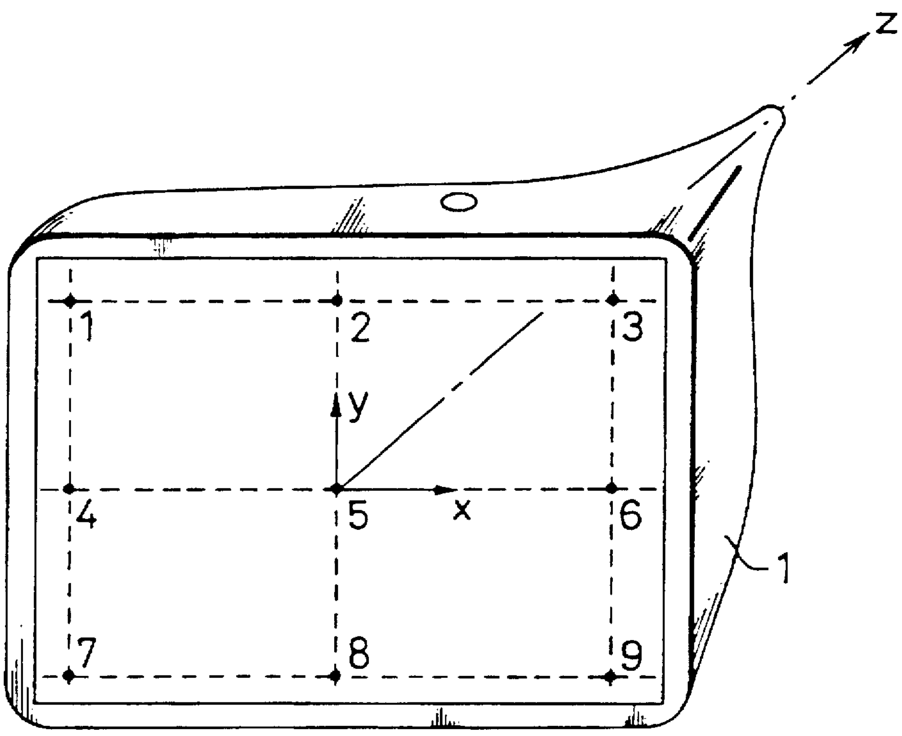
FIG. 3 is a perspective view illustrative of spots on a phosphor screen for measuring the deviation or error (Δ) between the center of the phosphor stripe and the central axis of the cathode ray.

As shown in FIG. 3, the deviation Δ is measured at a total of nine spots 1–9 arranged in three vertical columns and three horizontal rows over the color phosphor screen of a cathode-ray tube 1. The spots 1–9 are positioned inside of a rectangular area which is 90% of the total area of the color phosphor screen. In this embodiment, the deviation Δ is evaluated at the four corner spots, i.e., the spots 1, 3, 7, 9. In order to eliminate positioning errors of the deflection yoke, the deviation data from the four corner spots are converted into deviation data on the x-axis as follows:

$$\Delta_1'=\Delta_1-\Delta_4,$$

$$\Delta_3'=\Delta_3-\Delta_6,$$

$$\Delta_7'=\Delta_7-\Delta_4,$$

and $$\Delta_9'=\Delta_9-\Delta_6.$$

In this manner, the deviation Δ between the center of the phosphor stripe and the central axis of the cathode ray is evaluated at each of the spots 1, 3, 7, 9.

Figure 4:
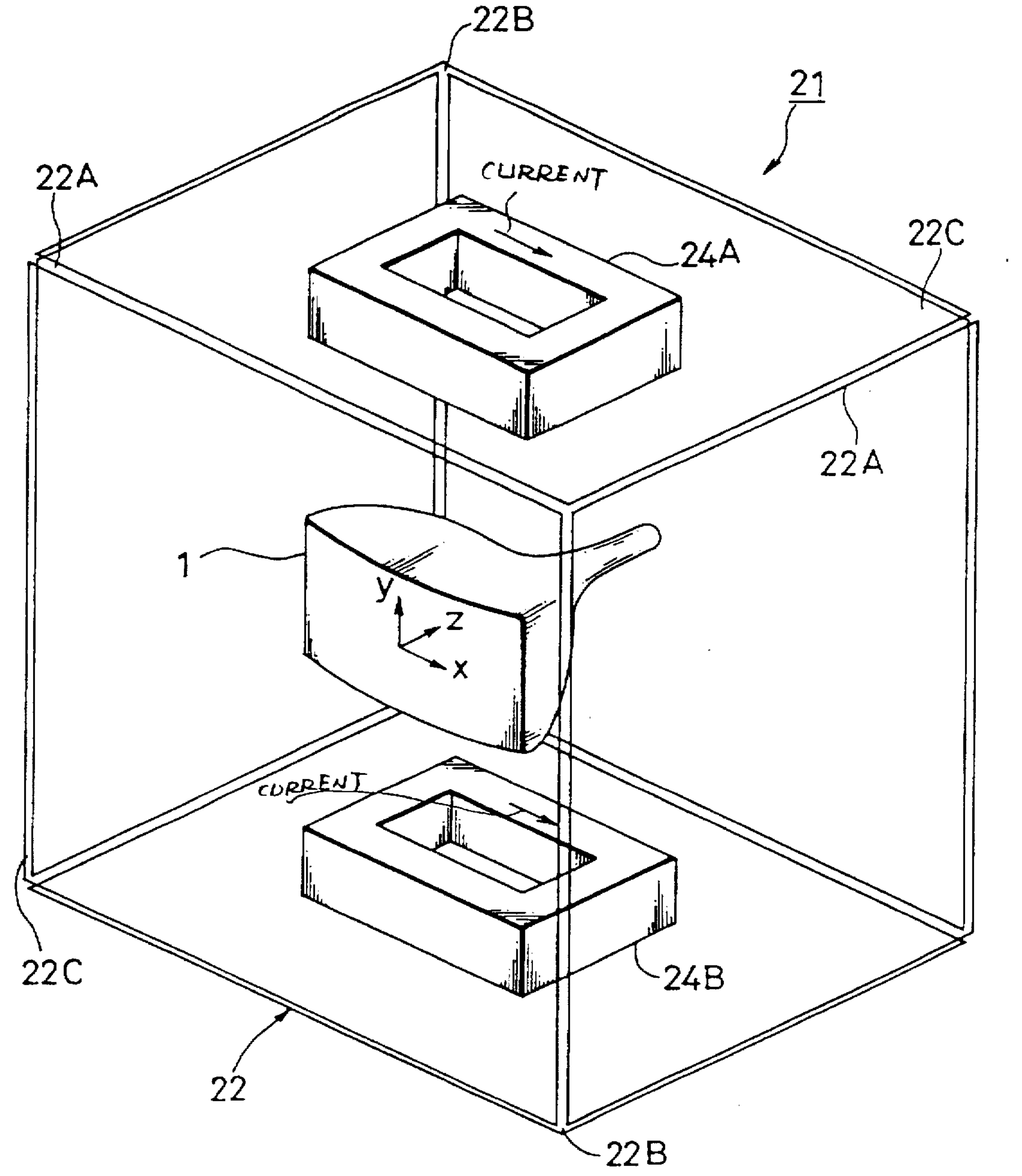
FIG. 4 is a perspective view of an apparatus for demagnetizing or magnetizing a color cathode-ray tube according to the present invention.

FIG. 4 shows an apparatus 21 for demagnetizing or magnetizing a color cathode-ray tube according to the present invention.

As shown in FIG. 4, the apparatus 21 comprises a Helmholtz coil assembly 22 comprising three pairs of coils 22A, 22B, 22C lying perpendicularly on respective three axes, i.e., x-, y-, and z-axes of a cathode-ray tube 1, for generating direct-current biasing magnetic fields in the directions of the x-, y-, and z-axes, and a pair of coils 24A, 24B positioned respectively above and below the cathode-ray tube 1, i.e., along the y-axis, for generating an alternating-current attenuating magnetic field. The coils 24A, 24B are supplied with an alternating attenuating current from a commercial power supply of 50 Hz or 60 Hz.

The alternating-current attenuating magnetic field generated by the coils 24A, 24B has a maximum coercive force of 100 kA•turns, and the coils 24A, 24B are spaced from each other by a distance of 700 mm.

Figure 5:
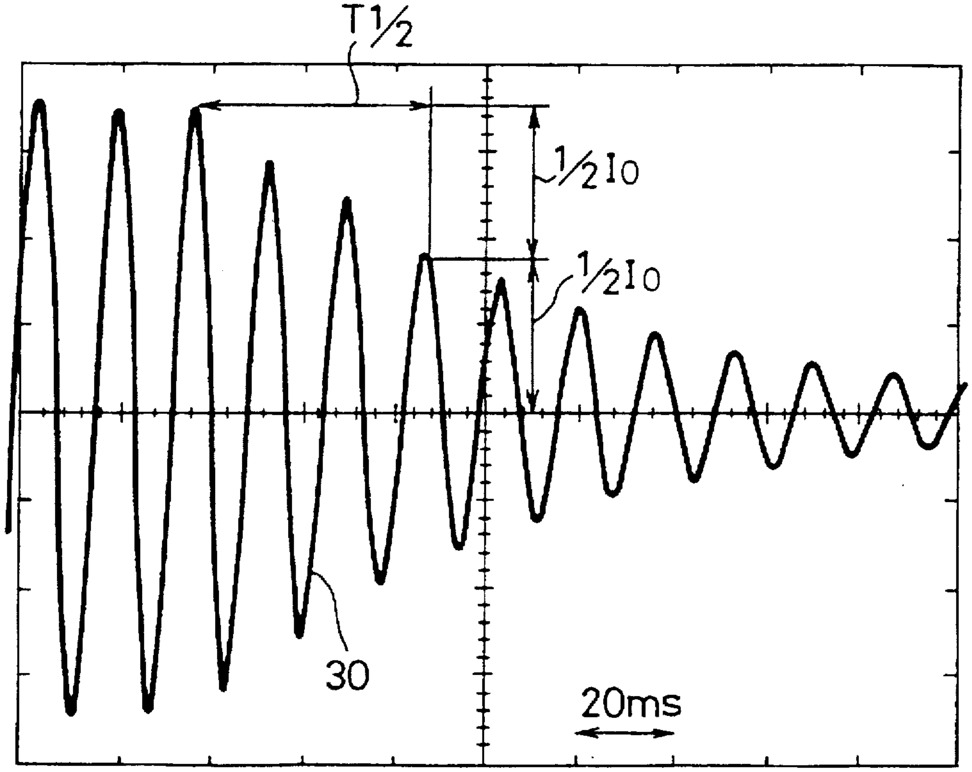
FIG. 5 is a diagram showing the waveform of an alternating current supplied to generate an alternating-current attenuating magnetic field.

FIG. 5 shows the waveform, denoted at 30, of an alternating current which is supplied to the coils 24A, 24B to generate an alternating-current attenuating magnetic field. A median attenuating time $T_{1/2}$, i.e., the time in which the alternating-current attenuating magnetic field falls to the median, is defined as a time in which the value of an initial current $I_0$ falls to ½.

Examples of a method of degaussing a color cathode-ray tube according to the present invention using the apparatus 21 shown in FIG. 4 will be described below. In the examples, a color cathode-ray tube having a size of 17 inches was used.

Example 1

In this example, the color cathode-ray tube was demagnetized.

With no color cathode-ray tube set in position in the apparatus 21, a direct-current biasing magnetic field is set to zero in the Helmholtz coil assembly 22. Thereafter, the color cathode-ray tube 1 is placed in the Helmholtz coil assembly 22, and an alternating-current attenuating magnetic field is applied to the color cathode-ray tube 1 by the coils 24A, 24B while no direct-current biasing magnetic field is being generated by the Helmholtz coil assembly 22. 50 samples of the deviation Δ between the center of the phosphor stripe and the central axis of the cathode ray were measured for each of median attenuating times $T_{1/2}$ of 0.05 second, 0.1 second, and 0.3 second, and dispersions of the deviation data as converted into deviation data on the x-axis were evaluated. The dispersions were represented by the mean values of standard deviations $\sigma_{n-1}$ at the four corner spots 1, 3, 7, 9 (see FIG. 3). The median attenuating times and the dispersions are shown in Table 1 below.

| | No. | $T_{1/2}$ (sec) | $\sigma_{n-1}$ of Δ (μm) |
|---|---|---|---|
| Comparative Example | 1 | 0.05 | 6.2 |
| Inventive Example | 2 | 0.1 | 3.2 |
| Inventive Example | 3 | 0.3 | 2.9 |

As can be seen from Table 1 above, the dispersion of the deviation Δ is very large with the median attenuating time $T_{1/2}$ of 0.05 second. However, the dispersions of the deviation Δ with the median attenuating times $T_{1/2}$ of 0.1 and 0.3 second are about half or less than half the dispersion of the deviation Δ with the median attenuating time $T_{1/2}$ of 0.05 second.

After the measurement, the welded members such as the support springs 7 of the color separation electrode 3 were measured for magnetization by a gaussmeter. For the median attenuating time $T_{1/2}$ of 0.05 second, the welded members were magnetized to several gausses. For median attenuating times $T_{1/2}$ of 0.1 and 0.3 second, however, only an environmental magnetic field was detected from the welded members.

Example 2

In this example, the color cathode-ray tube was subjected to magnetic transfer or magnetized.

Three samples of the difference Δd (=Δa−Δb) between a deviation Δa caused when no direct-current biasing magnetic field was applied to a cathode-ray tube 1, i.e., when the cathode-ray tube 1 was demagnetized, and a deviation Δb caused when a direct-current biasing magnetic field of 200 μT was applied to the cathode-ray tube 1 in the direction of the z-axis, i.e., when the cathode-ray tube 1 was magnetized, were measured for each of median attenuating times $T_{1/2}$ of 0.05 second, 0.08 second, 0.1 second, 0.2 second, 0.3 second, and 0.5 second. The relationship between the mean values of the differences Δd at the four corner spots 1, 3, 7, 9 and the median attenuating times $T_{1/2}$ is shown in FIG. 6.

Figure 6:
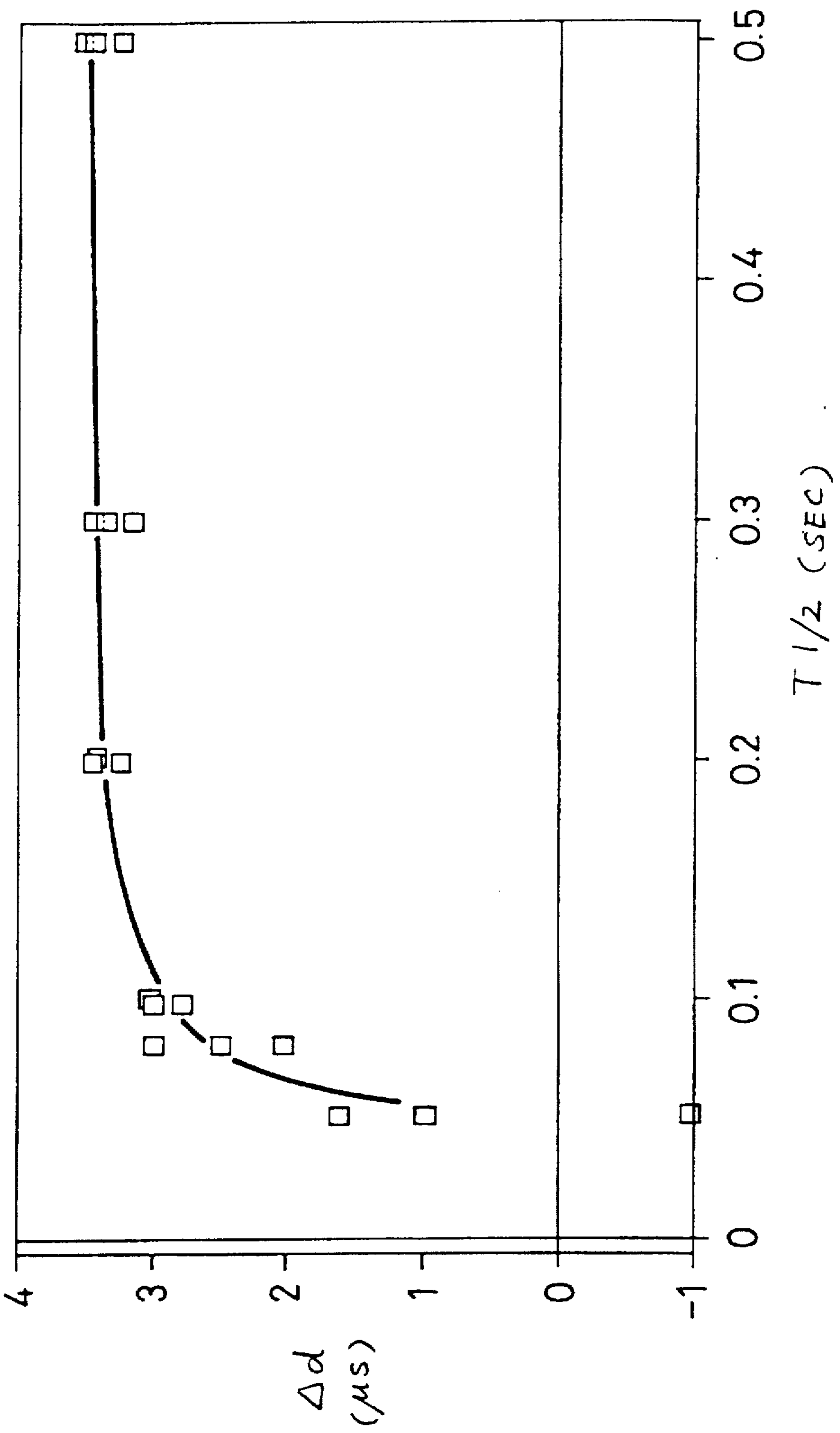
FIG. 6 is a graph showing the relationship between the time in which the alternating-current attenuating magnetic field falls to the median and variations in the amount by which the path of a cathode ray is corrected.

It can be understood from FIG. 6 that the three values of the difference Δd vary greatly and are unstable for the median attenuating time $T_{1/2}$ of 0.05 second, and that the three values of the difference Δd are substantially the same for each of the median attenuating times $T_{1/2}$ of 0.1 second and longer. For each of the median attenuating times $T_{1/2}$ of 0.2 second and longer, the three values of the difference Δd remain unchanged, indicating that the path of the cathode ray in the color cathode-ray tube can be corrected by large and stable magnetization.

The above method according to the present invention has been illustrated as being applied to demagnetization or magnetization in a process of manufacturing a color cathode-ray tube. However, the principles of the present invention are also applicable to a process of demagnetizing a completed cathode-ray tube with an alternating-current attenuating magnetic field that is generated when demagnetizing currents are supplied from a commercial power supply to upper and lower automatic degaussing coils placed on an outer surface of the cathode-ray tube. Specifically, the cathode-ray tube can stably be demagnetized when the median attenuating time of the alternating-current attenuating magnetic field is selected to be 0.1 second or longer, preferably 0.2 second or longer. Particularly, the method according to the present invention is highly advantageous if used to demagnetize a Trinitron color cathode-ray tube where the frame of an aperture grill is made of a material having a high iron content.

According to the present invention, when a color cathode-ray tube is demagnetized or subjected to magnetic transfer, i.e., magnetized with a direct-current biasing magnetic field, the median attenuating time of an alternating-current attenuating magnetic field which is used is selected to be 0.1 second or longer. As a consequence, the color cathode-ray tube can stably be demagnetized or subjected to magnetic transfer for correcting the path of a cathode ray in the color cathode-ray tube. The color cathode-ray tube thus magnetically processed is free of undue color shifts in color images displayed thereon.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A method of manufacturing a color cathode-ray tube, comprising the steps of:

fabricating a color cathode-ray tube;

generating a direct-current biasing magnetic field;

placing the color cathode-ray tube in the generated direct-current biasing magnetic field;

generating an alternating-current magnetic field in the direct-current biasing magnetic field in which said color cathode-ray tube is placed; and attenuating said alternating-current magnetic field to a median thereof in a median attenuating time of at least 0.1 second.

2. A method according to claim 1, wherein said alternating-current magnetic field is attenuated to the median in a median attenuating time of 0.2 second.

3. A method according to claim 1, wherein said direct-current biasing magnetic field has a value of zero.

4. A method according to claim 1, wherein said color cathode-ray tube comprises a phosphor screen comprising a plurality of color stripes and a color selection electrode disposed in confronting relation to said phosphor screen and having a plurality of vertically elongate slits defined therein.

5. A method of magnetically processing a color cathode-ray tube, comprising the steps of:

placing automatic degaussing coils on a color cathode-ray tube;

supplying demagnetizing currents to said automatic degaussing coils to generate an alternating-current magnetic field; and attenuating said alternating-current magnetic field to a median thereof in a median attenuating time of at least 0.1 second.

6. A method according to claim 5, wherein said alternating-current magnetic field is attenuated to the median in a median attenuating time of 0.2 second.

* * * * *